US012557785B2

(12) United States Patent　　(10) Patent No.:　US 12,557,785 B2
DiPaolo　　(45) Date of Patent:　Feb. 24, 2026

(54) PUPPY APARTMENT

(71) Applicant: Nicholas DiPaolo, Temecula, CA (US)

(72) Inventor: Nicholas DiPaolo, Temecula, CA (US)

( * ) Notice: Subject to any disclaimer, the term of this patent is extended or adjusted under 35 U.S.C. 154(b) by 625 days.

(21) Appl. No.: 16/948,438

(22) Filed: Sep. 18, 2020

(65) Prior Publication Data

US 2021/0000077 A1　Jan. 7, 2021

Related U.S. Application Data

(62) Division of application No. 13/330,526, filed on Dec. 19, 2011, now abandoned.

(60) Provisional application No. 61/445,796, filed on Feb. 23, 2011.

(51) Int. Cl.
*A01K 15/02*　(2006.01)
*A01K 1/03*　(2006.01)

(52) U.S. Cl.
CPC .............. *A01K 15/02* (2013.01); *A01K 1/034* (2013.01)

(58) Field of Classification Search
CPC ................................ A01K 15/02; A01K 1/034
See application file for complete search history.

(56) References Cited

U.S. PATENT DOCUMENTS

| | | |
|---|---|---|
| 2,932,279 A | 4/1960 | Giles |
| 3,098,465 A | 7/1963 | Ivey |
| 3,160,140 A | 12/1964 | Porter |
| 3,866,788 A | 2/1975 | Smit |

| | | | | |
|---|---|---|---|---|
| 4,735,173 A | * | 4/1988 | Dubreuil | ................ A01K 1/034 |
| | | | | 119/500 |
| 5,025,752 A | * | 6/1991 | Yananton | ............. A01K 1/0152 |
| | | | | 119/169 |
| 5,092,270 A | | 3/1992 | Simons et al. | |
| 5,158,041 A | | 10/1992 | Schmitz | |
| 5,247,901 A | | 9/1993 | Landon et al. | |
| 5,361,725 A | * | 11/1994 | Baillie | ................ A01K 1/0107 |
| | | | | 119/497 |
| 5,456,208 A | | 10/1995 | Choenchom | |
| 5,566,640 A | | 10/1996 | Krumrei | |
| 5,653,194 A | | 8/1997 | Guy | |
| 5,671,697 A | * | 9/1997 | Rutman | ................. A01K 15/02 |
| | | | | 119/472 |
| 5,727,502 A | * | 3/1998 | Askins | ................... A01K 1/033 |
| | | | | 119/499 |
| 6,032,614 A | | 3/2000 | Tominaga | |

(Continued)

FOREIGN PATENT DOCUMENTS

KR　　20040106882 A　　12/2004

OTHER PUBLICATIONS

Sitmeanssit, House Breaking Your Puppy, Aug. 24, 2008, https://sitmeanssit.com/housebreaking-puppies/ (Year: 2008).*

*Primary Examiner* — Christopher D Hutchens

(74) *Attorney, Agent, or Firm* — Orbit IP, LLP; Marc G. Martino

(57)　　　　　ABSTRACT

A puppy apartment for use by domestic animals includes a container portion and a room divider having a kennel opening thereby allowing the animal to pass between apartment bedroom and bathroom portions. Adjustable apartment boundary regions for bathroom, bedroom, and living areas are adaptably configured to accommodate the pet in a comfortable domestic training environment. A method is taught for providing positive and consistent household pet puppy training with the puppy apartment device.

15 Claims, 7 Drawing Sheets

(56)　　　　　References Cited

U.S. PATENT DOCUMENTS

| 6,192,834 | B1 | 2/2001 | Kolozsvari |
| 6,971,333 | B1* | 12/2005 | Hearrell ............... A01K 1/0245 |
| | | | 119/482 |
| 7,861,676 | B2 | 1/2011 | Kates |
| 2004/0139922 | A1 | 7/2004 | Kost et al. |
| 2006/0260972 | A1* | 11/2006 | Ayres ..................... A01K 1/034 |
| | | | 206/512 |
| 2008/0156276 | A1 | 7/2008 | Denenberg et al. |
| 2008/0264348 | A1* | 10/2008 | Gere ...................... A01K 15/02 |
| | | | 119/479 |
| 2009/0064939 | A1 | 3/2009 | Cirincione et al. |
| 2009/0223461 | A1 | 9/2009 | Trunnell et al. |
| 2010/0282179 | A1 | 11/2010 | Ho |
| 2010/0282180 | A1 | 11/2010 | Moffett-Chaney et al. |
| 2011/0168104 | A1 | 7/2011 | Matteson et al. |
| 2012/0118240 | A1* | 5/2012 | Bailey .................. A01K 5/0142 |
| | | | 119/59 |
| 2012/0186529 | A1 | 7/2012 | Cantwell et al. |

* cited by examiner

PUPPY APARTMENT

CROSS-REFERENCE TO RELATED APPLICATIONS

This divisional application claims priority application Ser. No. 13/330,526 filed on Dec. 19, 2011, which itself claimed priority to provisional application 61/445,796 filed on Feb. 23, 2011, the entire contents of which all applications are fully incorporated herein with these references.

DESCRIPTION

Field of the Invention

In general, the present invention is directed toward a puppy apartment device and a method for domestically training a puppy using the device

Background of the Invention

New pets and puppies need to learn about household products and activities with time, patience, and restrictions by the owner. When puppies explore and play they are unaware of household dangers such as poisons and electrical wires. There are typically many accidents during the training period of the puppy. Often times, the puppy or pet prefers not to use a pad or litter box or finds other functions for the absorbent materials throughout the house. It is generally desirable to lessen stress on the pet animal and its owner and to provide safe and useful alternatives for pet training conditions. Previous training methods make use of a single wire crate or compartment in a large room that do not accommodate the physical requirements and a safe training area for the puppy. In accordance with the present puppy apartment invention, consistent safe dwelling conditions and positive conditional recognition are used for domesticating and interacting with the pet during the household training period.

A pet is an animal kept for companionship, playfulness, song, attractive appearance, and enjoyment in a human household. Domestication or taming of animals is a process whereby the animal becomes accustomed and accepts human provision and control. In order for a household to accommodate the requirements of the pet puppy, regular intervals of attending the pet or constant supervision may be required. Training a new pet puppy about household items and to urinate or defecate at a specific site or time requires patience and may require weeks or months of repetitive conditional training and supervision. The present invention is puppy apartment device and method for household training the puppy using the device including intervals of human contact, feeding, and holding, as well as voice recognition and response.

Pet puppy training typically includes behavior modification and conditioning including: designating a waste elimination area or "potty", designating chewing of materials and furniture, treating carpet and flooring. Traditionally puppy/ dog owners train their pets to eliminate waste products by: leaving a newspaper, artificial grass, or potty pads on a designated floor space. Previous training methods make use of a single wire crate or compartment in a large room that does not accommodate positively reinforced household training of the pet and its biological urges or habits. Crate training is a popular method of leaving the pet in a limited space and maintaining its bladder and bowel until the owner decides it is time for the pet to eliminate waste products.

However, many puppies have pain when required to unnaturally "hold" urine and waste products for extended periods of time or overnight. It is widely believed the intervals in which a puppy eliminates waste product is every 1-2 hours while the adult dog eliminates waste product every 4-5 hours. It may be difficult for puppy owners who live in houses or apartments without backyards and grass to satisfy their household pet's physical and biological needs.

Retaining domesticated species in wire crates for a particular purpose is described in the patent to Smit, U.S. Pat. No. 3,866,788 as a we crate made of wires welded to one another. The stackable wire crate dimensions are connected for housing plant strips whereby plants sprout in a domesticated setting.

Animals trained for encountering the human and its environment are referred to as pets while those encountering other environments under human control are referred to as livestock or farm animals. For example the patent to Schmitz, U.S. Pat. No. 5,158,041 is directed to an animal holding crate defined by end frames with side frames therebetween to hold the animal and restraining members operated by means of a high power cylinder. The purpose for the crate in Schmitz is to permit the livestock animal free passage through the container in the open position. Such type of animal crate is used for restraining cattle for being examined, treated, vaccinated.

Retaining canines in an enclosure is described in Powell U.S. Pat. No. 6,553,940 as an enclosure kit with a plurality of panels connected together forming a dog kennel retaining area. The panels are disposed in a nested pattern for shipping and storing.

A ready rollable animal transport crate is evidenced in U.S. Pat. No. 5,653,194 to Guy. In Gere, U.S. Patent Application No. US 2008/0264348 an animal wire cage system is described; however no method for domestication or how the pet learns or interacts with trainer using the device is demonstrated. In Lee, KR 20040106882, there is described a pet crate with living space for the pet including a dining room with a window through which the dog sticks out its head to eat; however no method for domestication or how the pet learns or interacts with a trainer using the device is demonstrated.

There remains a need in the art for a pet apartment that includes kennel housing allowing the pet to comfortably enter the area, relieve itself, step away from the area in an natural manner, and return to its lair bedding while becoming domestically trained for household behavior and activities. The present invention fills that need.

SUMMARY OF THE INVENTION

In general, the present invention is directed toward a puppy apartment device and a method for domestically training a puppy using the device. A puppy apartment in accordance with the present invention relates to a container device capable of being divided into apartment portions having a kennel opening therebetween for the puppy to move from the bedroom portion to the bathroom portion and a method for domesticating and interacting with a pet using the device.

The puppy apartment device may include frames adjustably attachable for forming a container. In accordance with the present invention, the puppy apartment device may include frames such as a top frame, a bottom frame, and sidewall frames for forming a container portion.

The device may include an apartment room divider having a dividing frame attachable to the container portion interior and being less in height and width than the container portions and having a kennel opening positioned within the dividing frame thereby allowing the animal to pass from one interior apartment portion of the container to another interior apartment portion. Particularly, the room divider with kennel opening is adjustably positioned within the container to create a bedroom space only large enough for the pet to position itself to stand, turn, and stretch. The room divider configuration thereby provides a room or group of rooms connectably apart or an apartment. Additionally, the room divider containing the hole of a lair is adjustably positioned to fit the current size of the puppy as it grows; thereby creating space only large enough for the pet to sleep, stand, turn, and stretch within the bedroom quarters during the training process. The room divider is featured by the solid line while the remaining portion of the puppy apartment is show in broken line. The sleeping portion space size is limited to inhibit the pet from relieving itself of waste product in its sleeping quarters while allowing sufficient bathroom portion space and material in the container for the pet to relieve itself.

In accordance with another embodiment of the present invention, the container is collapsible for easily being stored or transported.

The pet owner can simplify clean up of animal wastes and labor intensive cleaning of the receiving receptacle area, and removing debris or stains from soiled floors by limiting the space the animal is allowed to use during training weeks or months. The puppy apartment relieves the pet owner of constant supervision of the pet puppy while maintaining consistent and comfortable shelter restrictions for household training a pet puppy. In accordance with the present invention, a removable bottom tray disposable within the container portion provides support for the weight of the pet and receiving and collecting domestic animal waste product, excrement, and urine.

Additionally, an absorbent pad is placed in the bathroom section on the container bottom portion and sidewall portions for collecting and removing animal waste and urine. Should the puppy/dog be male or prefer to hike one leg while urinating, then oversized pads that go up each section of the bathroom walls be attached to each wall of the bathroom or the entire container bottom may be lined with an absorbent pad, liner, or newspaper.

The puppy apartment container may also include a bedding material disposable within the bedroom portion for the pet to sleep and rest. Canines are den-dwellers, typically having a shelter and a lair, or bed in which to lie and rest. The room divider provides an opening, or kennel, adequate in size to allow the animal to move therethrough and sufficient to act as a retaining den-like wall for a bedroom which the pet may take shelter for sleeping therein.

In accordance with one embodiment of the present invention, wire walls are formed with frames having welded wires running perpendicular to one another and the surfaces being formed by spaced parallel end and side wire members being evenly divided into a plurality of rectangles by means of regularly spaced cross-wires. Means for securing the frames together include a plurality of connectors.

In accordance with another embodiment of the present invention, the container includes three frames having door openings for allowing the pet to pass therethrough. The middle door is shifted far to one side of the container for optimizing placement of the room divider.

Additionally, removable doors with latches are attachably disposable to the container for locking the sidewall frames in the closed container position. When the puppy is sleeping at night or napping, the puppy apartment may be closed. Eventually, after consistently applying the limited bedroom and bathroom quarters, the puppy is conditioned to use the puppy apartment for its elimination needs and the owner can open the two or three doors during the daytime so the puppy/dog has easy access to its bedroom and bathroom.

Further configuration of the puppy apartment, includes a less confined enclosure defined by frames connectably attachable to the apartment device for forming an apartment room or playpen and for retaining the pet therein. This configuration allows the puppy to sleep and play in the enclosed area and only use the bathroom section of the container for eliminating waste product.

An alternative embodiment of the present invention includes an adjustable bedroom attachment, or a lair, formable in multiple dimensions for accommodating pets of different size. The lair includes a bottom portion, a plurality of side portions, and a side portion having a door opening attachable to the puppy apartment container for forming a separate sleeping apartment. The lair may be adjustably attachable to a second dog crate which may be a standard wire dog crate.

Alternatively, the puppy apartment may be used as a bathroom attachment and adjustably attachable to a second dog crate which may be a standard wire dog crate.

The puppy apartment container is formable in multiple dimensions for accommodating pets of different size.

Additionally, the puppy apartment container further comprising a handle disposed on the container top portion for lifting the container.

In accordance with another embodiment of the present invention, the puppy apartment container further comprising wheels disposable on the container bottom tray or container bottom frame for easily moving and transporting the container.

A method in accordance with an embodiment of the present invention generally includes providing the puppy apartment device during positive interaction with a pet for domestic training.

The puppy apartment device provides a container, removable doors, a removable bottom tray, and an apartment room divider with a kennel opening within the container for allowing the pet to move therethrough and for creating a bathroom portion and a bedroom portion sufficient for allowing the pet to comfortably stretch and lie down.

Further, the method includes preparing the device for use by positioning an absorbent pad on the bathroom bottom portion and sidewall portions for collecting and removing animal waste and positioning a bedding material disposable within the bedroom portion for allowing the pet to comfortably stretch, lie down, and sleep.

The method further includes engaging the puppy by allowing the puppy to sniff, access the puppy apartment container and throughout the day without harsh verbal commands, fear, or anxiety. The positive conditional training method further includes feeding treats or food to the puppy only through the puppy apartment for positive conditional training of the puppy to the apartment area. The puppy may require exercise during daytime hours. The puppy may require coaxing or praising with "good dog" for positive reinforcement of desirable household behaviors.

The method further includes repetitive conditional training by locking the puppy in the apartment device and coaxing the puppy until it eliminates waste in the apartment bathroom portion. If the puppy is hesitant, then the trainer may hold and comfort the puppy followed by replacing it to the apartment device until it eliminates in the bathroom portion. The puppy conditionally learns the repeated verbal phrase such as "go potty" for training the puppy to eliminate "on command" in the bathroom portion.

Once the pet is trained with the puppy apartment, the pet owner may choose to make the puppy apartment the permanent indoor bathroom for the pet or an alternative bathroom in situations where outdoor access for relieving the animal is not available.

It is the principal object of the present invention to provide domestic household training of the pet within a localized indoor space.

It is another object of the present invention to provide a one bedroom, one bathroom potty training device and indoor bathroom for puppies and/or dogs.

It is another object of the present invention to provide a pet apartment having an adjustably attachable room divider separating apartment areas in the container device.

It is a further object of the present invention to provide alternative configurations of the puppy apartment for the trainer during the conditional household training of a pet puppy.

It is a still further object of the present invention to provide a method of using the pet apartment with positive conditional household training and domestication of a pet or puppy.

BRIEF DESCRIPTION OF THE DRAWINGS

The advantages and features of the present invention will be better understood by the following description when considered in conjunction with the accompanying drawings in which.

DETAILED DESCRIPTION OF THE PREFERRED EMBODIMENTS

Figure 1:
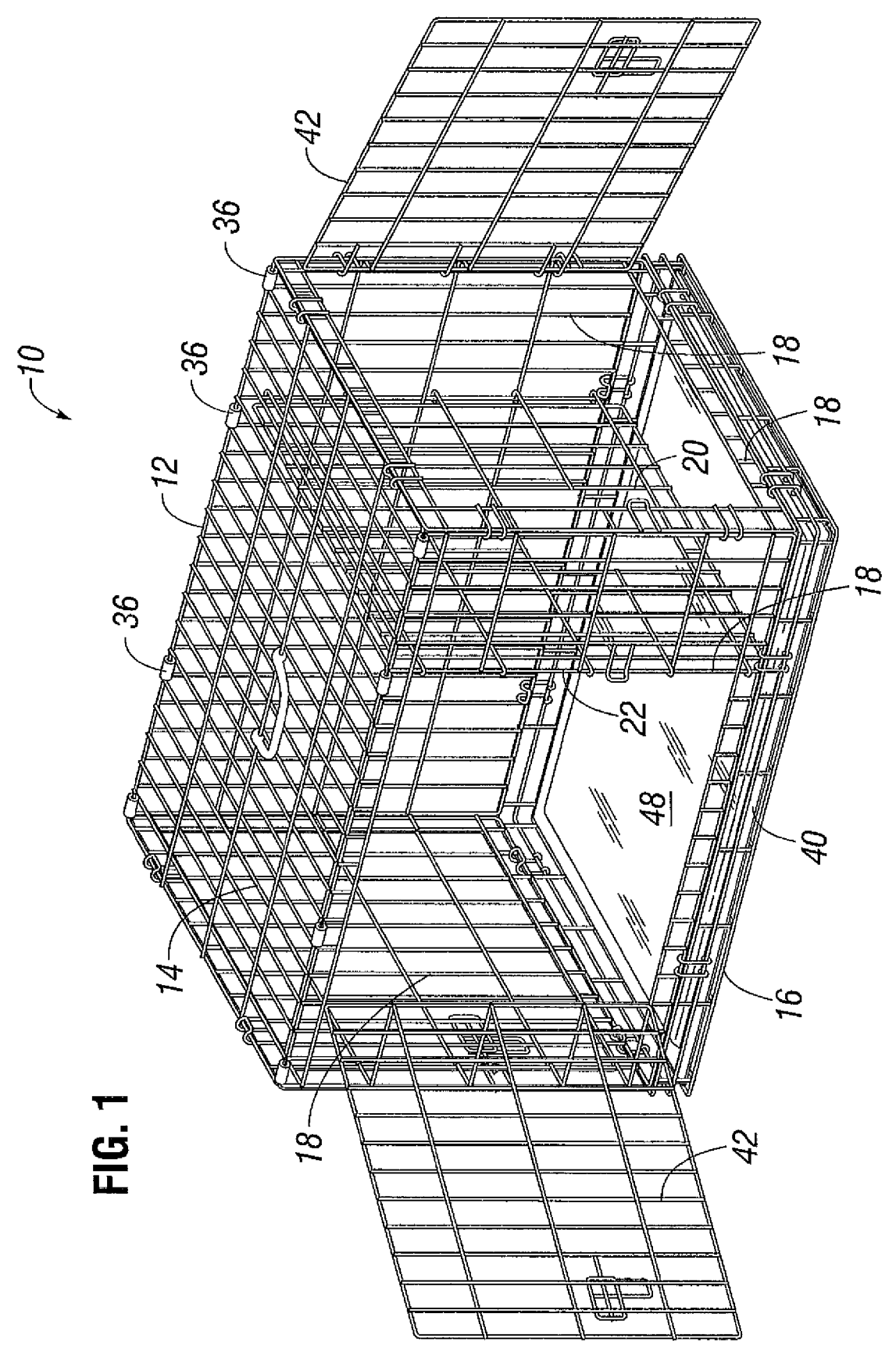
FIG. 1 is a perspective view of the puppy apartment device of the present invention.

Referring now to FIGS. 1-4, a puppy apartment container device 10 in accordance with the present invention includes frames 12 having a top frame 14, a bottom frame 16, and sidewall frames 18 preferably molded of metal, durable plastic material, or combinations thereof as shown in FIG. 1.

Figure 2:
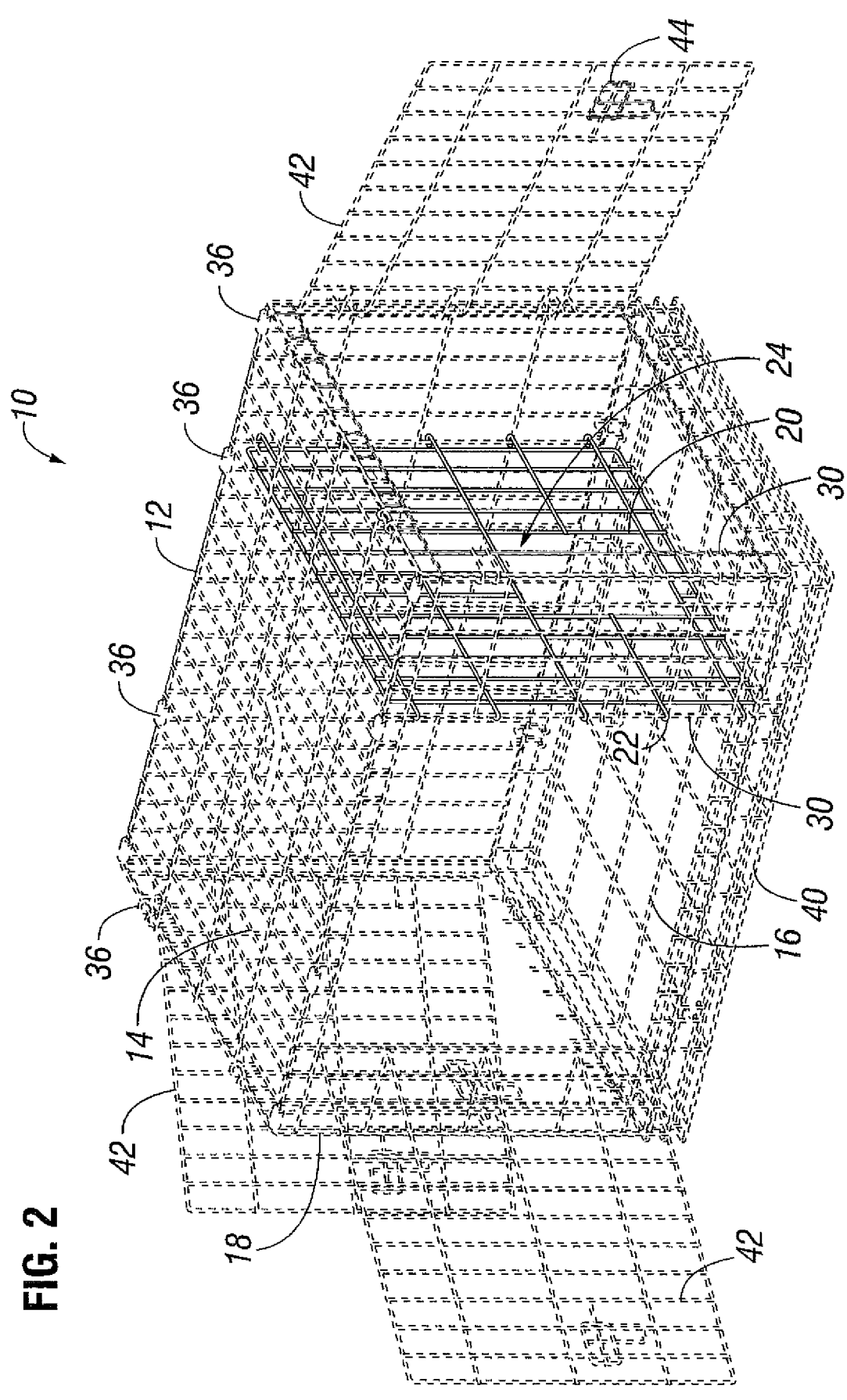
FIG. 2 is a perspective view a fully open puppy apartment in accordance with the present invention where the room divider is featured in solid line while the remaining portion of the puppy apartment is shown in broken line.
Figure 3:
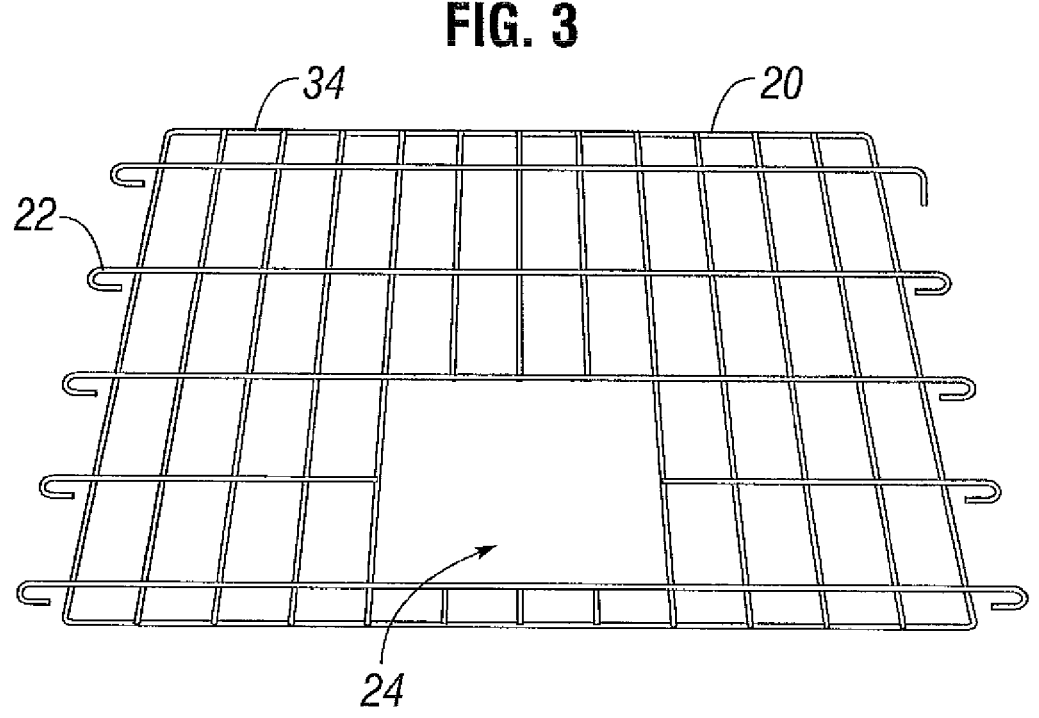
FIG. 3 is a view illustrating the apartment room divider having a kennel opening positioned within the divider frame thereby allowing the animal to pass from one interior apartment portion of the container to another interior apartment portion.

An apartment room divider 20 having a dividing frame adjustably attachable 22 to the container 10 portion interior and being less in height and width than the container 10 portions and having a kennel opening 24 positioned within the dividing frame as shown in FIGS. 2 and 3. The room divider 20 is featured by the solid line while the remaining portion of the puppy apartment container device 10 is show in broken line as shown in FIG. 2 for clarity.

Figure 4:
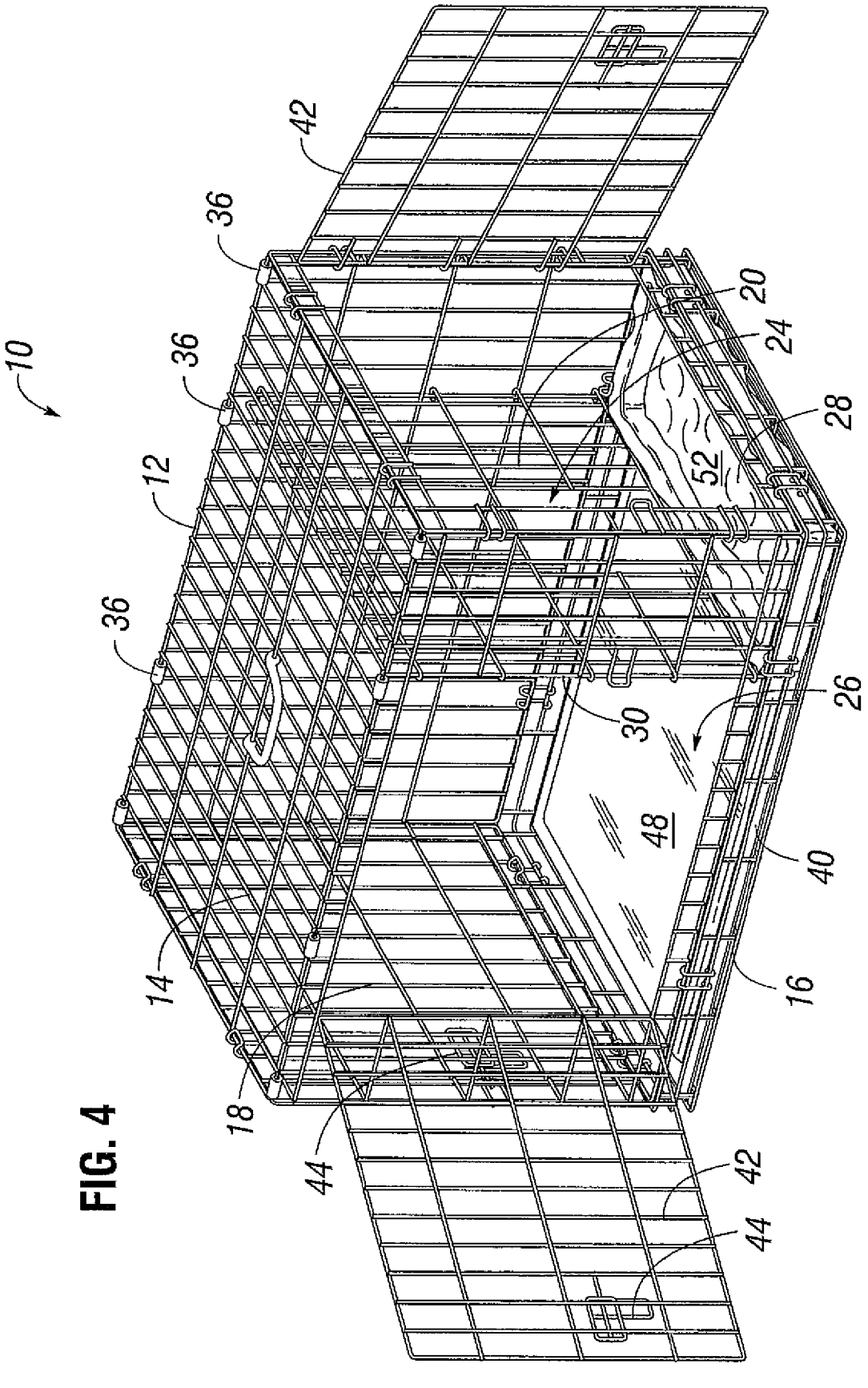
FIG. 4 is a perspective view of the puppy apartment device showing the adjustably positioned room divider positioned within the open puppy apartment with open doors, bedding, and absorbent pad in accordance with the present invention.

The pet or puppy may pass from one interior apartment portion of the container 10 to another interior apartment portion through the kennel opening 24 positioned within the puppy apartment container 10 as shown in FIGS. 2 and 4. The room divider 20 may be adjustably positioned and attached 22 within the container configurations employed in the present invention. The purpose of adjustably positioning 22 the room divider 20 is for creating a bathroom portion 26 and a bedroom portion 28 only sufficient for allowing the pet to comfortably stretch and lie down thereby discouraging the pet from eliminating waste in its bedroom area 28 (refer to FIG. 4). Additionally, as the puppy grows, adjusting placement of the room divider 20 thereby maintains only sufficient space within the bedroom portion 28 for the pet to comfortably stretch and lie down.

Door openings 30 in three sidewall frames 18 of the puppy apartment allow the pet to pass therethrough (FIG. 2). Wire walls 34 are formed with frames 12 having welded wires running perpendicular to one another and the surfaces being formed by spaced parallel end and side wire members being evenly divided into a plurality of rectangles by means of regularly spaced cross-wires (FIG. 3). The frames 12 are attachably secured with a plurality of connectors 36 as shown in FIGS. 2 and 4. Additionally, the attachably secured wire walls 34 thereby form a collapsible container.

As shown in FIG. 4, the puppy apartment container 10 configuration preferably provides a room divider 20, an opening or kennel 24 adequate in size to allow the animal to move from one apartment to another apartment. The room divider 20 acts as a retaining den-like wall for a bedroom 28 which the pet may take shelter for sleeping therein. A removable bottom tray 40 disposable within the container provides support for the weight of the pet and for receiving and collecting domestic animal waste product, excrement, and urine. Removable doors 42 with latches 44 disposable for locking the sidewall frames 18 in the closed position secure the puppy apartment container 10. Additionally an absorbent pad 48 disposable on the removable bottom tray 40 portion for collecting and removing animal waste and urine and bedding 52 material is shown in FIG. 4.

After consistently applying the limited bathroom 26 and bedroom 28 quarters, the puppy is conditioned to use the puppy apartment container 10 for its elimination needs and the owner can open the two or three doors 42 during the daytime so the puppy/dog has easy access to its bathroom 26 and bedroom 28.

Figure 5:
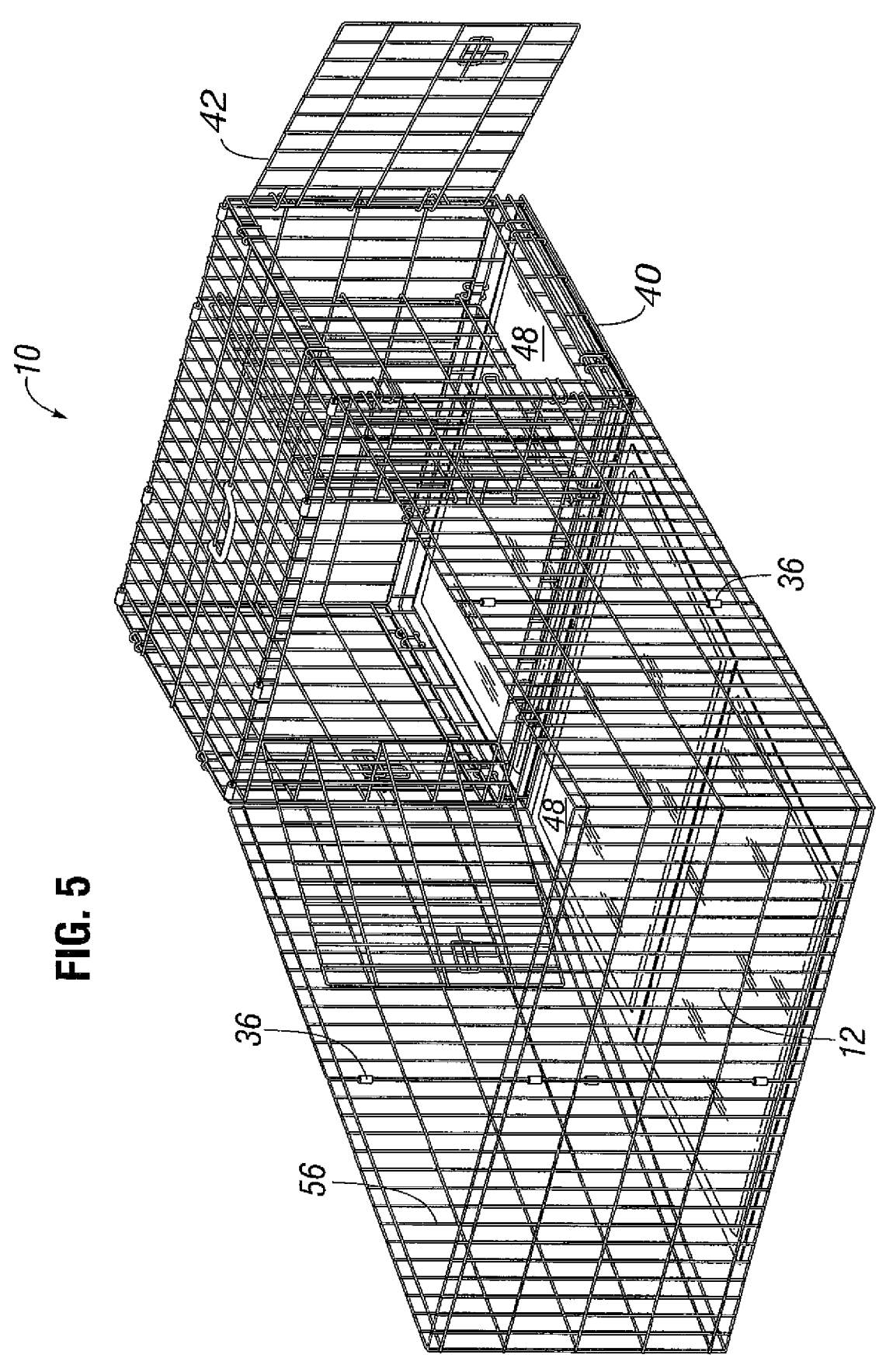
FIG. 5 is a perspective view of an enclosure defined by frames connectably attachable to the apartment device for forming an apartment room or playpen and for retaining the pet therein.

The puppy apartment container 10 further comprises a less confined enclosure defined by frames 12 connectably attachable to the apartment for forming an apartment room or playpen 56 and for retaining the pet therein as shown in FIG. 5. This configuration allows the puppy to sleep and play in a safe enclosed area and to use the bathroom 26 section of the container 10 for eliminating waste product.

Figure 6:
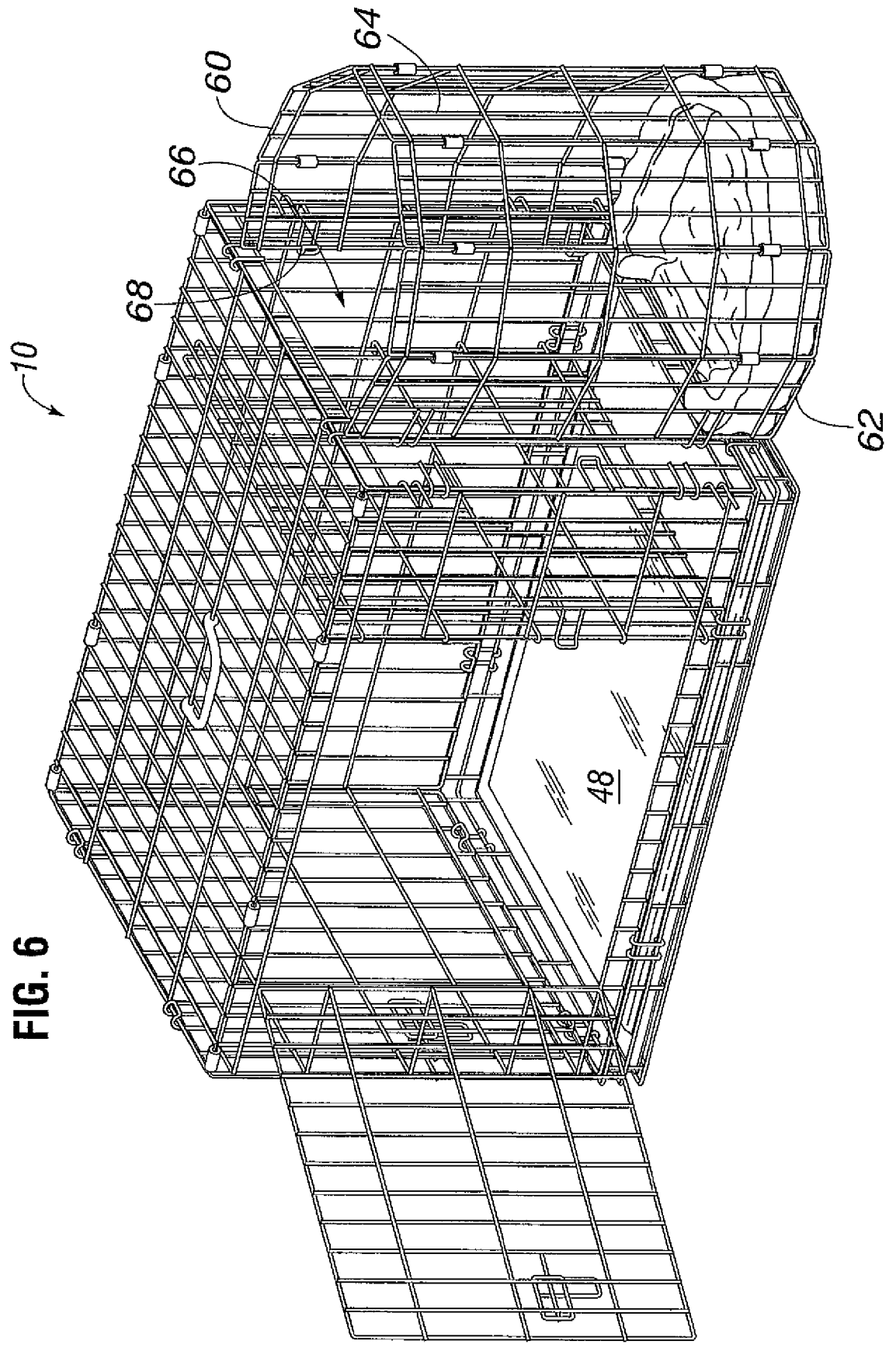
FIG. 6 is a perspective view of an adjustable bedroom attachment, or a lair, attachable to the puppy apartment container for forming a separate sleeping apartment.

In one embodiment as shown in FIG. 6, the puppy apartment may include a lair 60, or sleeping area. The lair, having a bottom portion 62, a plurality of side portions 64, and a side portion having a door opening 66 is attachable to the puppy apartment container 10 for forming a separate sleeping apartment 60. The lair 60 is alternatively attachable to a second dog crate. Additionally, the lair 60 is formable in multiple dimensions for accommodating pets of different size.

Figure 7:
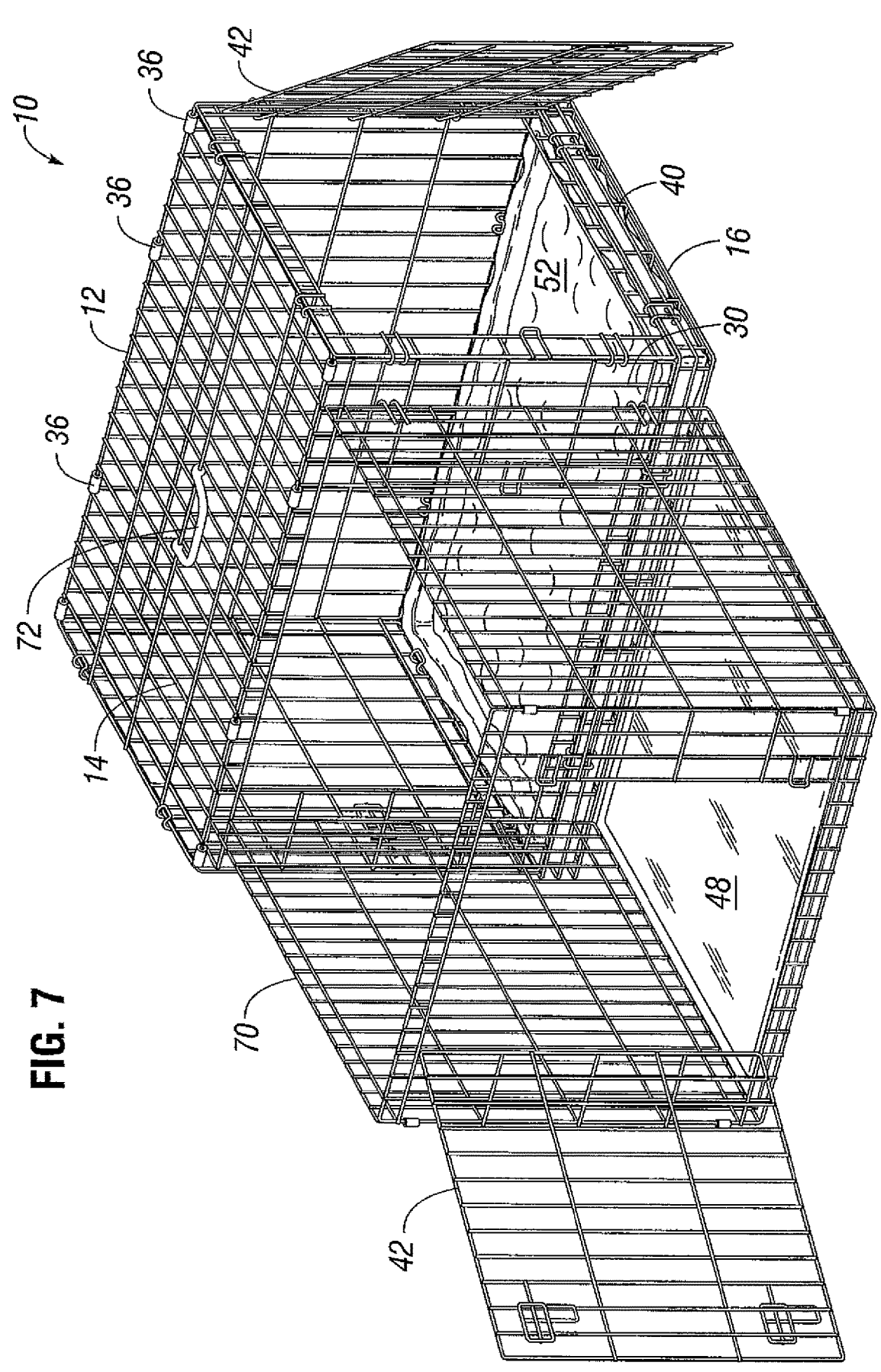
FIG. 7 is a perspective view of the puppy apartment as a bathroom attachment and adjustably attachable to a second dog crate.

Alternatively, the puppy apartment container 10 is adjustably attachable to a second dog crate 70 as shown in FIG. 7. Additionally, the puppy apartment is formable in multiple dimensions for accommodating pets of different size. Further, a handle 72 may be disposed on the container top portion 14 for moving or lifting the container 10 and wheels may be disposed on the container tray 40 or bottom 16.

Although there is described hereinabove a specific arrangement of a pet waste management system in accordance with the present invention for the purpose of illustrating the manner in which the invention can be used to advantage, it will be appreciated that the invention is not limited thereto. Accordingly, any and all variations and modifications which may occur to those skilled in the art are to be considered to be within the scope and spirit of the invention as defined in the appended claims.

What is claimed is:

1. A method for domestically training an animal, the method comprising the steps of:

providing a puppy apartment container comprising:

a top frame, a bottom frame, and four wire walled sidewall frames forming a rectangularly-shaped container portion; and an apartment room divider having a wire walled dividing frame adjustably attachable in a plurality of locations to a container portion interior and being less in height and width than said container portion and having a kennel opening positioned within said dividing frame thereby allowing the animal to pass from one interior apartment portion of the container to another interior apartment portion;

wherein the adjustable attachment of the apartment room divider between the plurality of locations within the container portion interior changes the relative size of the one interior apartment portion of the container in relation to the another interior apartment portion;

wherein the sidewall frames and dividing frame each have perpendicularly running welded wires having surfaces being formed by spaced parallel end and side wire members being evenly divided into a plurality of rectangles by regularly spaced cross-wires thereby forming wire walls;

wherein the dividing frame is adjustably attachable in the plurality of locations to the spaced parallel end and side wire members of two of the oppositely disposed sidewall frames, wherein the plurality of locations comprise at least three pairs of successively disposed spaced parallel end and side wire members of the two oppositely disposed sidewall frames;

locating the apartment room divider at a first location of the plurality of locations based upon a first size of the animal, the first location establishing the one interior apartment portion as a first bedroom portion only large enough for the animal to position itself to stand, turn and stretch, and the first location establishing the another interior apartment portion as a first bathroom portion; and locating the apartment room divider at a second location of the plurality of locations based upon a second size of the animal as the animal grows, the second location establishing the one interior apartment portion as a second bedroom portion sized larger in comparison to the first bedroom portion while still only large enough for the animal to position itself to stand, turn and stretch, and the second location establishing the another interior apartment portion as a second bathroom portion sized smaller in comparison to the first bathroom portion.

2. The method for domestically training an animal as in claim 1, wherein the puppy apartment container further comprises a door opening disposed within any of the four wire walled sidewall frames for allowing the animal to pass therethrough.

3. The method for domestically training an animal as in claim 1, wherein said puppy apartment container is collapsible.

4. The method for domestically training an animal as in claim 1, wherein the puppy apartment container further comprises a plurality of connectors for securing together said frames.

5. The method for domestically training an animal as in claim 1, wherein the puppy apartment container further comprises a removable bottom tray disposable within said container portion for providing support for a weight of the animal and for receiving and collecting domestic animal waste product, excrement, and urine.

6. The method for domestically training an animal as in claim 1, wherein the puppy apartment container further comprises removable doors with latches disposable for locking said sidewall frames in the closed position.

7. The method for domestically training an animal as in claim 1, wherein the puppy apartment container further comprises an absorbent pad disposable on the bottom frame and sidewall frames for collecting and removing animal waste and urine.

8. The method for domestically training an animal as in claim 1, wherein the puppy apartment container further comprises a material disposable within the container for providing bedding.

9. The method for domestically training an animal as in claim 1, wherein said puppy apartment container is adjustably attachable to a standard wire dog crate.

10. The method for domestically training an animal as in claim 1, wherein said puppy apartment container is formable in multiple dimensions for accommodating animals of different size.

11. The method for domestically training an animal as in claim 1, wherein the puppy apartment container further comprises a handle disposed on the top frame for lifting said container.

12. The method for domestically training an animal as in claim 1, wherein the apartment room divider is the only apartment room divider in the puppy apartment container.

13. A method of training a puppy with a puppy apartment container, comprising:

providing the puppy apartment container with a top frame, a bottom frame, sidewall frames, removable doors, and a removable bottom tray;

placing an absorbent leak-proof disposable pad on said removable bottom tray and said sidewall frames for collecting and removing animal waste and urine;

attaching an apartment room divider with a kennel opening within said puppy apartment container for creating a bathroom portion and a bedroom portion sufficient for allowing the puppy to comfortably stretch and lie down;

adjusting placement of said apartment room divider as the puppy grows thereby maintaining sufficient space within said bedroom portion for the puppy to comfortably stretch and lie down; and engaging and conditionally training the puppy within said apartment container for reinforcing desirable domestic household behaviors.

14. The method of claim 13, wherein engaging the puppy comprises:

allowing the puppy to sniff and to access the puppy apartment container throughout the day without fear or anxiety;

feeding treats or food to the puppy only through the puppy apartment for positive conditional training of the puppy to the apartment area;

exercising the puppy during daytime hours;

coaxing the puppy into said apartment; and praising the puppy with "good dog" for reinforcing desirable household behaviors.

15. The method of claim 14, wherein conditional training comprises:

locking said removable doors on the apartment container in the closed position for maintaining the puppy therein;

engaging and praising the puppy in said apartment container until it eliminates waste in said bathroom portion;

holding and comforting the puppy followed by replacing it to said apartment container until it eliminates in said bathroom portion;

repeating verbally to the puppy "go potty" for training the puppy to eliminate "on command" in the bathroom portion.

\*   \*   \*   \*   \*